March 30, 1965     F. L. BROWNE     3,176,064
END FITTING FOR SUPPORTING, SEALING AND GROUNDING
MULTICONDUCTOR ARMORED CABLE ON STEEL CONDUIT
Filed March 12, 1963     3 Sheets-Sheet 3

INVENTOR.
FRANK L. BROWNE
BY
ATTORNEY

United States Patent Office 3,176,064
Patented Mar. 30, 1965

3,176,064
END FITTING FOR SUPPORTING, SEALING AND GROUNDING MULTICONDUCTOR ARMORED CABLE ON STEEL CONDUIT
Frank L. Browne, Wantagh, N.Y., assignor to O.Z. Electrical Manufacturing Co., Inc., Brooklyn, N.Y., a corporation of New York
Filed Mar. 12, 1963, Ser. No. 264,566
1 Claim. (Cl. 174—78)

The invention herein disclosed relates to the supporting, sealing and grounding of multiconductor armored cable such as used in "Minuteman" operations.

Objects of the invention have been to adequately grip and support the heavy cable where it issues from the end of the steel conduit and to fully and effectively seal the cable to the conduit and to fully and securely ground the one or more layers of armor embodied in the cable.

Special objects are to effect these results without in any way impairing or injuring the insulation or armor of the cable or the many small insulated conductors forming the core of the cable.

Further important objects of the invention have been to embody all these features in a simple compact unit form of construction readily applicable to the conduit and readily adjustable to effect the proper supporting, grounding and sealing of the cable.

Other important objects accomplished by the invention and the novel features of construction, combination and arrangement of parts through which all such objects have been attained are set forth and will appear in the course of the following specification.

The drawings accompanying and forming part of this specification are illustrative of presently preferred commercial embodiments of the invention. Structure however may be modified and changed as regards such illustration, all within the true intent and scope of the invention as hereinafter defined and claimed.

FIG. 1 in the drawings is a side elevation of one of the end fittings, partly broken away and in section to show internal features of construction.

The fittings shown have been designed for "Minuteman" cable having an outer jacket of insulation 7, and first and second armor layers 8, 9 containing a multiplicity of insulated wires 10.

The end fitting consists of a tubular body in the nature of a sleeve or ring 11 carrying the sealing, grounding and supporting fittings and internally screw threaded as shown at 12 for engagement on the end of a conduit nipple such as shown at 13 or for direct attachment to the steel conduit (not shown).

Figure 1:
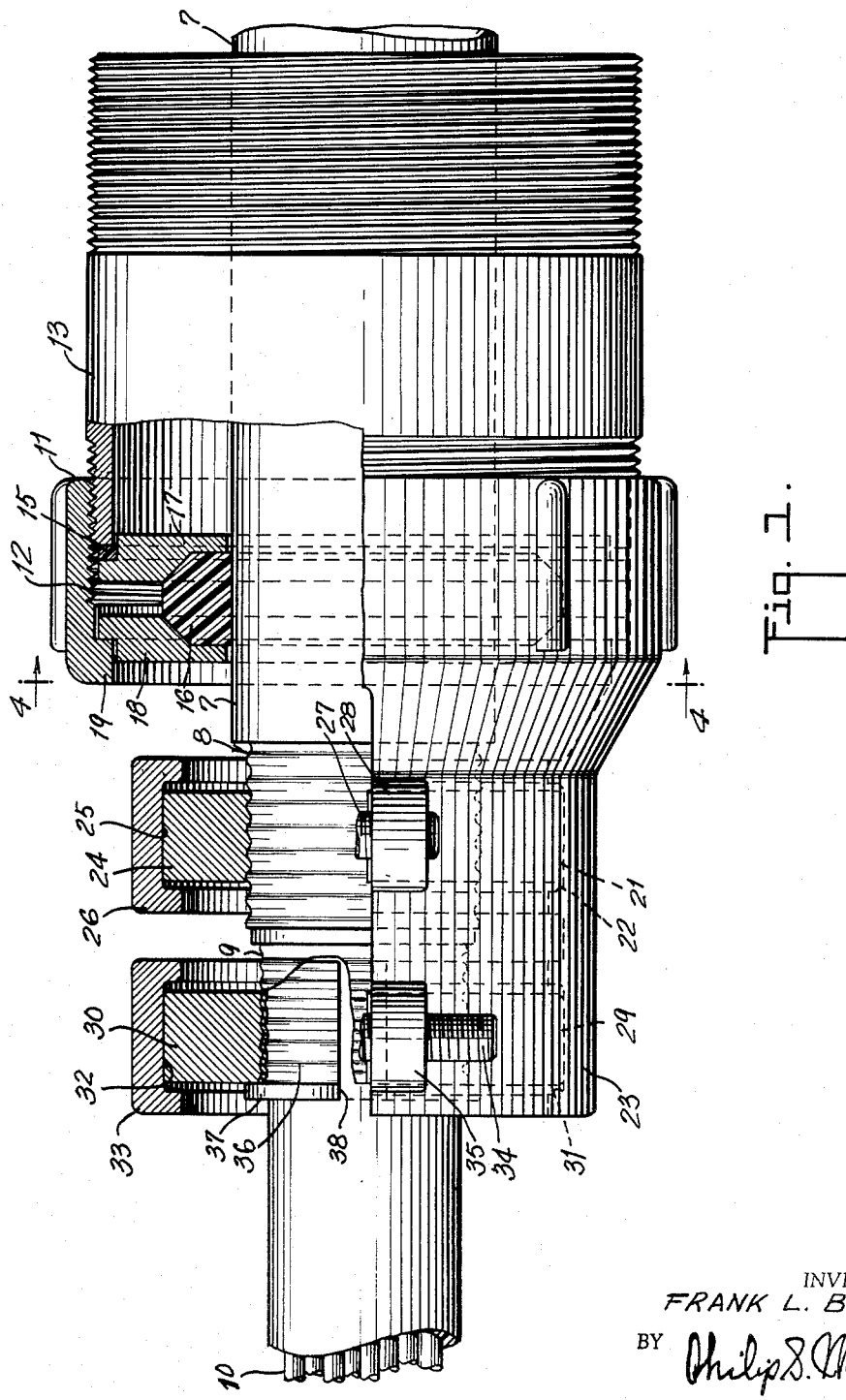

If the conduit has a smooth squared end the body may be screwed as a unit directly on the end of the conduit, with a gasket such as shown at 15 in FIG. 1, sealing it to the end of the conduit.

If however the conduit does not have a smooth, straight end, a nipple 13 may be used, secured to the end of the conduit by a coupling (not shown) such as ordinarily used with steel conduit.

Where a nipple is used the fitting is sealed to the end of the nipple by a gasket 15, FIG. 1, such as Vellumoid or the like.

The outer sheath or jacket 7 of the cable is sealed by a surrounding "doughnut" form of gasket 16, such as molded neoprene, compressed against the sheath between inner and outer, reversely inclined companion clamping rings 17, 18, engaged between the end of the nipple, or the conduit, if the unit is directly applied to the end of the conduit, and a retaining flange 19 on the body or housing of the unit.

Referring more particularly to FIG. 1 the first armor layer 8 which may be of bronze or other metal is seated in a semicircular clamping segment 21, conformed to the contour of the armor and loosely confined within a semicircular cavity 22 in the lower portion of the housing extension 23 projecting from the ring-like base of the unit.

A companion, similarly contoured, upper semicircular clamping segment 24 is confined in self-adjusting relation in a wider semicircular seat 25 in an overstanding arch or cap 26 secured by screws 27 to lugs 28 on opposite sides of the housing extension.

Initially the two, cooperating clamp segments 21 and 24 are free in their seats to adjust themselves to the convolutions or corrugations of the armor 8 and this adjustment is effected automatically as the screws 27 are turned to clamp this armored portion of the cable into centered and supported relation in the housing.

Similarly the inner layer of armor 9, which usually may be of steel, is centered, supported and secured by companion lower and upper clamp segments 29, 30 held in oversize seats 31, 32 in the housing and the cap 33, all secured by screws 34 extending through the ends of the cap into screw lugs 35 on the extended portion of the housing.

Figure 2:
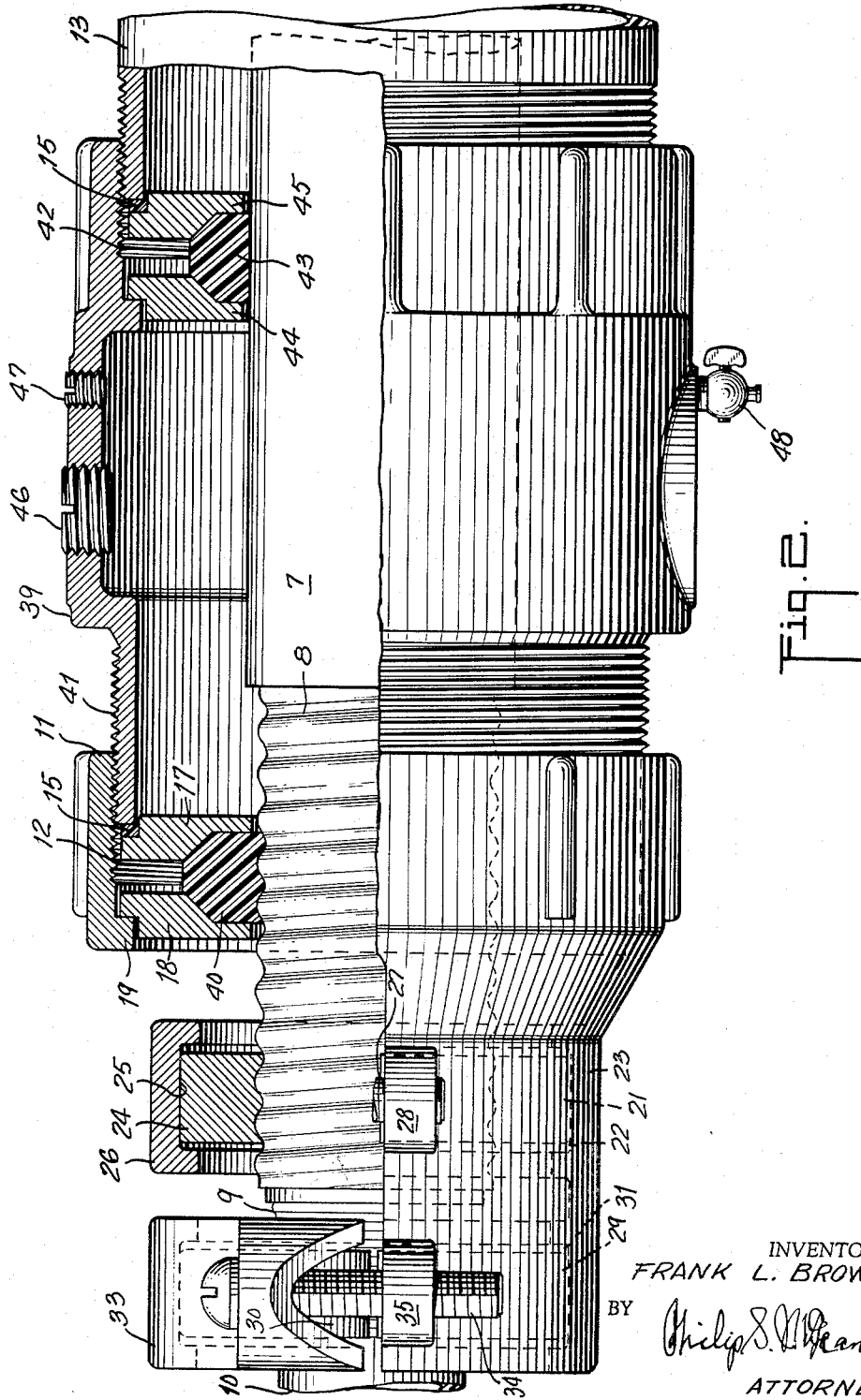
FIG. 2 is a similar view of a modified form of the invention used with cables having no sealer between the outer jacket and the first layer of armor.

If the armor convolutions are helical as in FIG. 2, allowance may be made for greater self-adjustment to permit the clamp segments to shift one way or the other to match the turns in the armor by widening the seats such as 22, 31 in which the segments are mounted, accordingly.

To prevent crushing of armor 9, a bushing 36, contoured similar to this armor is shown inserted within the armor, to the extent permitted by the annular shoulder 37 at the outer end of this bushing.

This protective bushing is shown as split by having a slot 38, FIG. 1, cut in the side of the same enabling it to be contracted in forcing it beneath the armor and permitting it to be contracted sufficiently to properly grip the cable and to fit the cable which may vary in size. The width of the slot in the side of this bushing also determines the extent to which the bushing may be contracted, this being such as to prevent injury to the armor or to the cable enclosed within the armor.

If there is only one layer of armor the second clamp is not necessary and if there are more than two layers the necessary number of supporting and grounding clamps would be provided.

The housing extension 23 is shown as of reduced diameter to save space and to bring the armor clamp or clamps down to size more nearly approximating the diameter of the cable and it will be noted that such clamp or clamps is or are located close to the cable seal at 16, all in accurately centered relation.

Where the cable has no sealer between the outer jacket 7 and the first layer of armor 8, the construction shown in FIG. 2 may be employed, comprising an intermediate or secondary housing 39, containing a seal between the conduit and the sheath of the cable and carrying, in addition, a seal to the armor.

In practice the unit first described is used but the seal carried thereby is modified, as shown at 40 in FIG. 2, to engage the armor layer 8. Otherwise this unit may be the same, as indicated by the same reference characters.

The extra or inserted extension 39 is shown as screw threaded at one end at 41 to engage in the housing 11 and screw threaded at 42 at the opposite end to engage the nipple 13 or to directly engage the end of the conduit if that end is smooth and straight, permitting use of a sealing gasket 15.

The seal to the sheath of the cable is shown as made up of gasket 43 between clamp rings 44, 45 similar to the sealing features previously described.

If sealing compound is considered desirable the space in the housing extension 39 between the outer seal 43 and the armor seal 40 may be filled with such compound.

If no sealing compound is to be used provision may be made for drainage of any accumulated moisture within the fitting, such as a drainage cock 48 in the bottom of the fitting as shown in FIG. 2.

On the other hand, if compound is to be used no drainage cock is necessary and the fitting may then be provided simply with filling and relief plugs 46 and 47 in the top of the same.

The fitting, in both forms illustrated, is of simple, rugged construction, readily applied to the end of the conduit and sealed in the act of connecting it with the conduit. If the conduit has a smooth, straight end the unit may be secured direct to the conduit with a single sealing gasket.

The open top construction of the housing extension containing the armor clamps enables full inspection and any necessary adjustment of these clamps.

The self-adjusting mounting of the upper and lower clamp sections assures complete positive engagement with the armor layers and the closing of these clamps is effected in each instance by simply tightening the two screws holding the upper clamp segment.

The split bushing inserted under the inner armor, reinforces this armor and prevents excessive pressure being applied to the core of the cable. It also allows pressure of the clamping pieces to be made fully effective for gripping and positively grounding the armor.

In the fully secured relation the cable, including outer sheath and one or more armor layers, is fully centered, sealed and grounded to the conduit.

The clamp sections may be made to fit different forms of armor, such as smooth, convoluted or corrugated, thus to assure positive lasting grip and complete grounding.

Where sealing with insulating compound is desirable the added section of the unit provides holding space for such compound to seal the armor as well as the sheath of the cable.

Where no compound is used the added section provides both for sealing and for drainage of any accumulating moisture.

Figure 3:
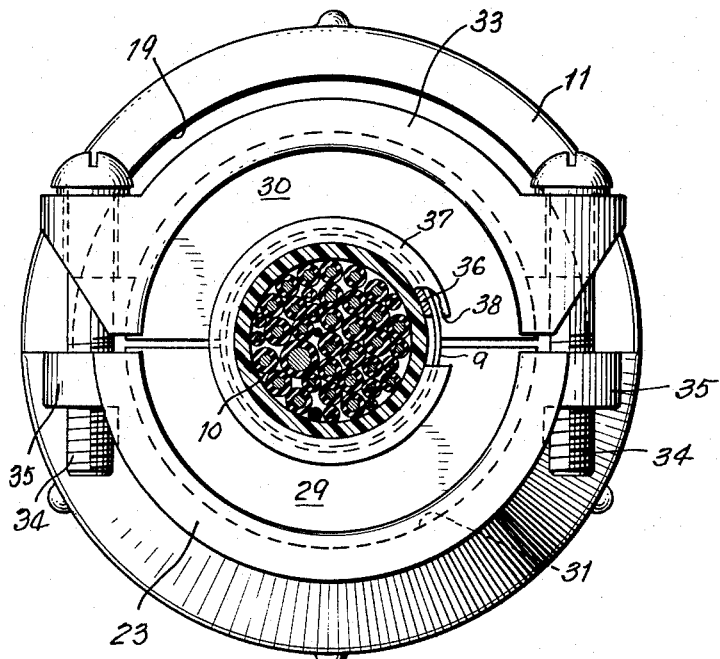
FIG. 3 is an end view of the fitting, with the cable appearing in section.
Figure 4:
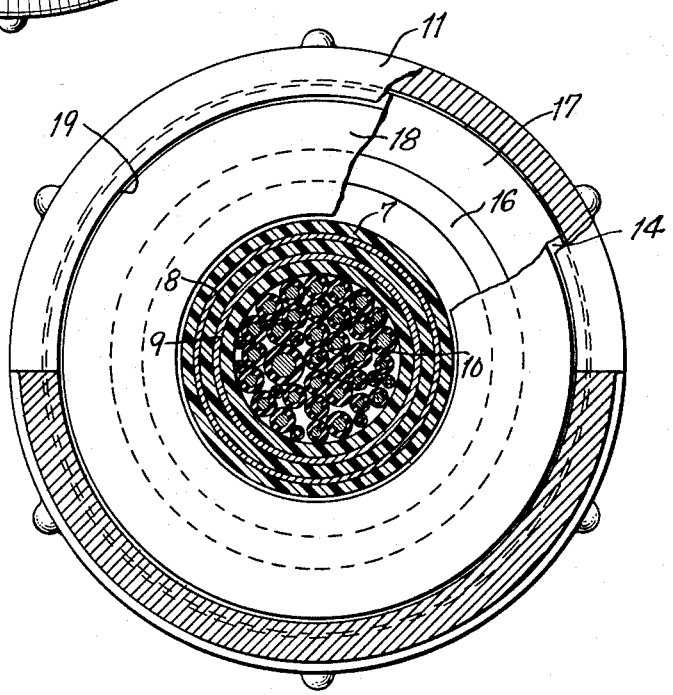
FIG. 4 is a broken and part sectional view on substantially the plane of line 4—4 of FIG. 1.

The screws for securing the armor clamp or clamps may be of extra length, as shown in FIG. 3, to provide for attachment of a ground wire or wires.

The armor clamping segments, such as illustrated at 21, 24 and 29, 30, are carefully shaped or formed to accurately fit the armor which they are intended to hold and the seats in which they are mounted are finished so that they may adjust themselves to quite exactly fit the armor, thus to assure proper centering, supporting, gripping and grounding without injury to the armor or other portions of the cable.

While usually desirable or necessary to provide wider seats 22 and 31 for the lower clamp segments to fit these segments to the armor, the caps 26 and 33 may give the upper segments enough initial freedom of movement to properly engage the armor so that widened seats in the caps may not be necessary.

What is claimed is:

An end fitting for supporting, centering, sealing and grounding multiconductor armored cable on steel conduit, comprising a tubular housing internally screw threaded at one end for engagement directly over the screw threaded end of steel conduit or for engagement with a screw threaded member applicable over the end of said conduit, said housing having an integral, part tubular extension projecting from the opposite end thereof and open at the top for exposure of armored cable projecting from the conduit to which the fitting is applied, means for sealing the full tubular screw threaded end portion of the housing to conduit to which it is applied, means for sealing the housing to the external surface of armored cable extending from the conduit through the housing, companion, relatively adjustable armor gripping upper and lower clamp members supported in independently adjustable relation in said open extension of the tubular housing, a cap over the open top portion of the housing extension, said cap and the portion of the extension in which the lower clamp member is seated having seats for the upper and lower clamp members of larger extent than said clamp members for enabling independent self-adjustment of the clamp members to fit the armor of the enclosed cable, said companion clamp members being independently adjustable in their respective seats, said cap engaging said upper clamp member for closing said clamp members into holding engagement with the armor of the cable, clamp closing screws adjustably securing said cap to said open top extension and thereby automatically centering and grounding the cable armor as the cap is secured in fixed relative on the housing, a contractible split bushing between said upper and lower clamp members, said bushing being corrugated to match the contour of the armor on the cable and by reason of its split construction being contractible to enable it being forced over the cable into position beneath the armor, and the split formation of the bushing being provided by a slot in one side of the bushing enabling the bushing to accommodate itself to variations in the diameter of the cable enclosed therein.

References Cited by the Examiner

UNITED STATES PATENTS

| 1,789,379 | 1/31 | Dillon | 285—373 X |
| 1,839,761 | 1/32 | Hutton | 285—419 X |
| 1,842,216 | 1/32 | Thomas | 174—83 X |
| 2,189,350 | 2/40 | Morris | 285—373 |
| 2,210,340 | 8/40 | Reinhardt | 285—419 X |
| 2,315,623 | 4/43 | Jacobi | 174—77 |
| 3,040,120 | 6/62 | Berry | 174—77 |
| 3,052,748 | 9/62 | Curtiss | 339—13 X |
| 3,061,666 | 10/62 | Duvall et al. | 174—92 |

LARAMIE E. ASKIN, *Primary Examiner.*

JOHN P. WILDMAN, JOHN F. BURNS, *Examiners.*